United States Patent [19]

Fan et al.

[11] Patent Number: 4,608,264

[45] Date of Patent: Aug. 26, 1986

[54] PRETREATMENT OF FRIED FOOD PRODUCTS WITH OIL CONTAINING EMULSIFIERS

[75] Inventors: Lucy L. Fan, Irving, Tex.; Javier A. Arce, LaPaz, Bolivia

[73] Assignee: Frito-Lay, Inc., Dallas, Tex.

[21] Appl. No.: 653,702

[22] Filed: Sep. 24, 1984

Related U.S. Application Data

[63] Continuation-in-part of Ser. No. 575,278, Jan. 30, 1984, abandoned.

[51] Int. Cl.[4] .................... A23L 1/01; A23L 1/217
[52] U.S. Cl. ..................................... 426/438; 426/439
[58] Field of Search ............... 426/549, 550, 560, 622, 426/629, 634, 637, 438, 439, 441, 654, 662, 440, 808

[56] References Cited

U.S. PATENT DOCUMENTS

| | | | |
|---|---|---|---|
| 1,982,186 | 11/1934 | Working | 426/438 X |
| 3,355,299 | 11/1967 | McLaughlin et al. | 426/441 |
| 4,084,016 | 4/1978 | Kon et al. | 426/560 X |
| 4,120,990 | 10/1978 | Seiden | 426/601 |
| 4,140,803 | 2/1979 | Panchuk et al. | 426/560 X |
| 4,188,410 | 2/1980 | Rispoli et al. | 426/438 X |
| 4,317,842 | 3/1982 | El-Hag et al. | 426/438 X |
| 4,359,482 | 11/1982 | Crosby | 426/438 X |
| 4,375,483 | 3/1983 | Shuford et al. | 426/601 X |
| 4,503,127 | 3/1985 | Fan et al. | 426/438 |

FOREIGN PATENT DOCUMENTS 2313176  9/1973  Fed. Rep. of Germany ...... 426/637

*Primary Examiner*—Arthur L. Corbin
*Attorney, Agent, or Firm*—Bernard, Rothwell & Brown

[57] ABSTRACT

A method for treating sliced or sheeted starchy foods before frying, in which the slices are washed in oil containing emulsifiers such as lecithin before introduction into the fryer.

15 Claims, No Drawings

PRETREATMENT OF FRIED FOOD PRODUCTS WITH OIL CONTAINING EMULSIFIERS

CROSS-REFERENCE TO RELATED APPLICATION

This application is a continuation-in-part of application Ser. No. 575,278, filed Jan. 30, 1984, now abandoned.

BACKGROUND OF THE INVENTION

1. Field of the Invention

This invention pertains to the preparation of fried snack foods, and particularly to a method for treatment of starch-containing sliced vegetables and doughs prior to frying so as to eliminate sticking of the slices during cooking without the addition of water to the slice.

2. Prior Art

Fried snack foods are a staple of the European and American diets. Such products are made from sliced vegetables, typically potatoes, or from doughs made from starch-containing grain flour to potato flakes. Potato chips are prepared commercially in automated plants using a number of processing machines, many of which have been patented (see U.S. Pat. Nos. 2,091,675 and 2,179,035) and by performing a number of common steps which have been the subject of frequent modification (see U.S. Pat. Nos. 2,611,705 and 4,283,437). Processes to make fried potato products directly from potatoes involve some combination of these basic steps: (1) peeling, (2) slicing, (3) washing, (4) frying in edible oils, and (5) seasoning. Characteristically, uncooked, unwashed slices or stampings are coated with a layer of starch which causes the individual pieces to stick to each other when they are allowed to come into contact with each other during handling, or deep fat frying. The resultant clump of food is unevenly cooked and must be removed from the commercial product. In addition, the direct frying of unwashed slices results in starch build-up in the cooking oil. The problem is particularly acute when the product if a french fried potato, shoestring potato, or potato chip made directly from the sliced, uncooked potato. It has become a long-standing practice in the industry to wash sliced starchy vegetables in warm water or brine to remove the surface starch prior to frying. While this procedure limits the clumping of the slices, water washing has several disadvantages. First, the washing results in a lower product yield because of the loss of starch and because of the mechanical breakage of the slices during handling. Second, the washing process adds water to the slice, which water must be removed prior to or during frying. Numerous inventions have been patented to remove the water prior to frying (for example, see U.S. Pat. No. 4,251,895 to Chardis). Since frying includes driving off surface and included water from the slice, the energy consumed in frying is directly related to the amount of water carried to the fryer. Finally, the wash water must be treated to remove starches and potato fragments before it can be discharged into the environment. There exists, therefore, a need for any process which will produce a commercially acceptable fried product without the need for a water wash of the uncooked slices.

Another undesired effect of the traditional methods for frying foods is the high percentage of lipid which remains in the final product. Typical fats and oils used in deep frying are triglycerides which are readily saponified and absorbed in the small intestine. Triglycerides provide twice the calories per gram of carbohydrates and proteins, and typical potato chips contain as much as 40% lipid by weight. Many of the alternative processes described for making foods which are similar in appearance to fried foods yield a product lower in lipid, but achieve the result by inclusion of more process steps, the addition of more ingredients, or by less efficient heat-transfer steps. For example, Murray (U.S. Pat. No. Re. 27,531) describes a process for recoating a blanched potato with amylose starch to provide a barrier to oil uptake. The result of these processes rarely has the uniquely satisfying taste, texture or appearance of a good potato chip, french fry, or similar food product.

A number of food-grade emulsifiers are compatible with cooking oils normally used in deep fat frying. Mono- and diglycerides are esters of glycerol which differ from typical fats and oils by being incompletely esterified. The resultant product has a hydrophobic component—the esterified part of the glycerol—and a hydrophilic component—the free hydroxyl(s)—at the other end of the molecule. These emulsifiers are digested by pathways analogous to that of fats and oils, but when present in a cooking oil, they allow the oil to dissolve a limited amount of water. Phospholipids are a class of compounds which are mixed esters of alcohols with ethanolamine derivatives and phosphoric acid. The most important phospholipids are the lecithins, mixed esters of glycerol and choline with fatty acids and phosphoric acid. Commercial lecithin is extracted from soybeans and usually includes cephalins and other trace natural products. Soybean lecithin is frequently used as an emulsifying agent in oleomargarine and mayonnaise, and in the formulation of the dough for many oven baked products. Polyglycerol esters are homologues of glycerides and retain most of their chemical and physical properties. They are used as emulsifiers where lower volatility is required.

SUMMARY OF THE INVENTION

This invention is an improved method for preparing french fried potatoes, shoestring potatoes, potato chips and other starchy snack foods through the elimination of moisture external to the slices, specifically by treating the slices with cooking oil containing limited amounts of emulsifiers, at a temperature below the gelatinization temperature of the surface starch, to reduce stickiness of the slices in the fryer. Slices washed in vegetable oil containing small amounts of emulsifiers such as the mono- and diglycerides, polyglycerol esters and lecithin can be fried directly after washing to produce a snack food with higher solids content and lower included lipids, while producing less solid waste and eliminating the need to treat and discharge waste water.

DETAILED DESCRIPTION OF THE INVENTION

Starchy vegetables such as potatoes are prepared in the conventional manner by peeling, slicing, washing, frying and seasoning. The slices are usually washed in water or brine before frying to remove surface starch, and available commercial high volume processing equipment designs also use the water to cool and lubricate the slicer and to wash the slices down a sluice to the wash tanks. In the wash tank, surface starch is removed and small, irregular slices are selected out by proper choice of the conveyor which removes the slices from the wash tank. If the slices are fried without washing, the surface starch causes the slices to stick to each other, providing unevenly heated slices and frequent lumps of chips or fries which are not acceptable in the trade. Water-washed slices carry water to the fryer, which must then be boiled off with the included water in the slices. We have found that substitution of typical cooking oil, such as partially hydrogenated cottonseed or soybean oil, for wash water eliminates the energy losses involved in driving off surface water and reduces the solids loss in the water washing step, but the sticky sliced surface causes an unacceptable loss due to clumping in the fryer. The addition of emulsifiers such as lecithin to the vegetable oil used in the wash has been found to almost totally eliminate the clumping in the fryer, and allows the production of a commercially acceptable french-fried potato, shoestring potato, potato chip or other fried starch-containing snack food. The treatment of the slices with vegetable oil and emulsifier is carried out at a temperature which is below the gelatinization temperature of the surface starch, e.g., below about 148° F. in the case of potato starch, in order to avoid gelatinization of surface starch which can cause sticking of the slices during frying. The lower limit of the treatment temperature is not critical and the treatment is advantageously carried out at ambient temperature. In the preferred embodiment, the emulsifier is added directly to the vegetable oil to maintain a concentration of about 0.05–1% (w/v) in the wash tank. In the preferred embodiment, superior emulsifying properties of soybean lecithin solubilize a portion of the starch and allow the oil to form a surface coating on the wet, sticky slice. The surface coating allows the slices to slide easily across each other and prevents clumping on the conveyor and in the fryer. As the slices are conveyed from the wash tank to the fryer, the excess lecithin is drained off with excess surface oil, resulting in very low transfer of lecithin to the fryer.

In the practice of this invention, it has been found that less surface starch is removed than by the traditional water wash. A typical potato used to make chips, such as a Monona potato, is approximately 80 to 85% water. When a Monona potato is sliced and washed in water, only 85% of the weight of the potato slice solids is recovered in the final fried chip. By the practice of this invention, yields of solids are increased by about 10% to 95%, and lipid content is lowered by approximately 5%. Moisture content is also slightly lower.

A further advantage obtained by the practice of this invention is greater throughput in the frying operation. Water-washed potato slices carry water on their external surfaces, thereby requiring more heat to drive off the water, limiting the rate at which wet slices can be introduced into the oil. The use of an emulsifier such as lecithin in the oil wash allows more slices to be introduced into the cooking oil per unit time before the limiting amount of water is reached in the oil. In addition, heat transfer through the oil-coated slice is more efficient than through water which is being volatilized, resulting in a faster cook and less residence time for the slice in the fryer. Because less water is introduced into the fryer per kilogram of potato slices, less cooking oil is lost through steam distillation and less oil must be heated and introduced into the fryer. Finally, greater throughput means that less energy is lost in radiation from the fryer and attendant plumbing, and there are fewer heat losses in the boiler and heat exchanger.

The invention has been described for use with potatoes, in the production of french-fried potatoes, shoestring potatoes, and potato chips. The use of this invention in the preparation of other fried snack foods will be apparent to those skilled in the art. Examples, which are not meant to be limiting, are dough-based snack foods made from corn, wheat or bean flour or flakes, and fried tubers other than potatoes. The utility of the present invention is demonstrated by the following examples.

EXAMPLE 1

Monona potatoes, containing 15% solids, were peeled, sliced, divided into three groups and weighed. Group A was washed in 25° C. water for 10 seconds, drained, and fried in 184° C. (365° F.) commercial cottonseed oil for approximately 2 minutes. Group B was washed for 10 seconds in cottonseed oil containing 0.5% (w/v) lecithin at 25° C., drained and fried in 184° C. cottonseed oil for 2 minutes. Equal weights of groups A and B chips were extracted with anhydrous diethyl ether for 6 hours in a Soxhlet extractor, dried and weighed (A.O.A.C., 13th ed., Section No. 7.055) in order to calculate the oil content in chips. The extracted slices were placed in a vacuum oven and heated overnight at 100° C. for moisture determinations. The percentage of solids yield was determined by weighing the finished chips after extraction of oil and removal of moisture, as described above, and dividing by the weight of the uncooked slices after drying in oven. The results of three determinations are summarized in Table 1.

TABLE 1

Comparison of Water Washed and Lecithin-in-Oil Washed Potato Chips

|  | Group A | Group B |
| --- | --- | --- |
| % Solids | 84.6 | 95.4 |
| % Oil in chips | 48.2 | 43.6 |
| % Moisture in chips | 0.80 | 0.76 |

EXAMPLE 2

Monona Potatoes Were Peeled and Sliced and Sorted Into Four Groups

Group A was washed for 10 seconds in water at 25° C., Group B was washed in cottonseed oil, Group C was washed in cottonseed oil containing 1% (w/v) soybean lecithin, and Group D was not treated. Four slices from each group were stacked and introduced into 184° C. cottonseed oil. After 2 minute frying, the number of free slices was counted. If all four slices were separate, a stickiness value of 0% was assigned, if one was separated, a value of 75% was assigned; if two were separated from the group, a value of 50% was assigned; if the four slices remained attached, a value of 100% was assigned. The average of eight separate determinations is summarized in Table 2.

TABLE 2

Stickiness of Potato Slices in the Fryer

|  | Group A | Group B | Group C | Group D |
| --- | --- | --- | --- | --- |
| % Stickiness | 0 | 75 | 0 | 100 |

We claim:

1. A method for preparing fried starch-containing sliced or dough-based snack foods comprising washing starch-containing vegetable food pieces in a vegetable oil containing about 0.05-1% (w/v) of a food grade emulsifier, at a temperature below the gelatinization temperature of the surface starch, and then frying the washed pieces.

2. The method of claim 1 in which a phospholipid is dissolved in the vegetable oil prior to washing.

3. The method of claim 1 in which a mono- or diglyceride is dissolved in the vegetable oil prior to washing.

4. The method of claim 1 in which a polyglycerol ester is dissolved in the vegetable oil prior to washing.

5. The method according to claim 1 in which a mixture of food grade emulsifiers is used.

6. The method of claim 1 in which the emulsifiers used are chosen from the group consisting of mono- and diglycerides, polyglycerol esters and phospholipids.

7. The method of claim 1 in which the snack food is a potato chip prepared from potato slices.

8. The method of claim 1 in which the snack food is a french-fried potato prepared from potato slices.

9. The method of claim 1 in which the snack food is a shoestring potato prepared from potato slices.

10. The method of claim 1 in which the snack food is a corn chip prepared from corn meal dough.

11. The method of claim 1 in which the snack food is a fried bean chip prepared from bean meal dough.

12. The method of claim 1 in which the snack food is a potato chip prepared from potato flake or potato flour dough.

13. The method of claim 1 in which the snack food is a fried wheat chip prepared from wheat dough.

14. The method of claim 1, wherein the snack food is prepared from potato pieces and they are washed in the vegetable oil and food grade emulsifier at a temperature below about 148° F.

15. The method of claim 1, wherein the pieces are washed in the vegetable oil and food grade emulsifier at ambient temperature.

* * * * *